(12) United States Patent
Li et al.

(10) Patent No.: US 12,452,899 B2
(45) Date of Patent: Oct. 21, 2025

(54) SIGNAL TRANSMISSION METHOD, TERMINAL DEVICE, AND NETWORK DEVICE

(71) Applicant: VIVO MOBILE COMMUNICATION CO., LTD., Guangdong (CN)

(72) Inventors: Gen Li, Chang'an Dongguan (CN); Peng Sun, Chang'an Dongguan (CN); Huaming Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 416 days.

(21) Appl. No.: 18/105,133

(22) Filed: Feb. 2, 2023

(65) Prior Publication Data
US 2023/0189321 A1  Jun. 15, 2023

Related U.S. Application Data

(63) Continuation of application No. PCT/CN2021/110255, filed on Aug. 3, 2021.

(30) Foreign Application Priority Data

Aug. 5, 2020 (CN) .......................... 202010780216.X

(51) Int. Cl.
*H04L 5/00* (2006.01)
*H04B 7/06* (2006.01)
(Continued)

(52) U.S. Cl.
CPC ........ *H04W 72/542* (2023.01); *H04B 7/0695* (2013.01); *H04L 5/0051* (2013.01); *H04W 72/1263* (2013.01)

(58) Field of Classification Search
CPC .. H04W 16/28; H04W 72/23; H04W 72/1273
See application file for complete search history.

(56) References Cited

U.S. PATENT DOCUMENTS

2017/0353227 A1    12/2017  Liu et al.
2018/0310322 A1*   10/2018  Zhang .................. H04B 7/0408
(Continued)

FOREIGN PATENT DOCUMENTS

CN    108024344 A    5/2018
CN    109391984 A    2/2019
(Continued)

OTHER PUBLICATIONS

Qualcomm Incorporated, "Enhancements on Multi-Beam Operation," 3GPP TSG-RAN WG1 Meeting #98, R1-1909273, Aug. 26-30, 2019, Prague, Czech, 19 pages. (Year: 2019).*
(Continued)

*Primary Examiner* — Romani Ohri
(74) *Attorney, Agent, or Firm* — Price Heneveld LLP

(57) ABSTRACT

This application pertains to the field of communications, and discloses a signal transmission method, a terminal device and a network device. The method includes: performing signal transmission at a position of a target symbol by using a target transmission mode, where the target transmission mode includes at least one of the following transmission modes: skipping performing target uplink transmission at the position of the target symbol; skipping performing target downlink transmission at the position of the target symbol; skipping performing, at the position of the target symbol, target uplink transmission with a TCI state different from that of target reference signal; or skipping performing, at the position of the target symbol, target downlink transmission with a transmission configuration indicator TCI state different from that of the target reference signal; where the target (Continued)

symbol is a beam switching symbol of the target reference signal.

18 Claims, 7 Drawing Sheets

(51) Int. Cl.
*H04W 72/1263* (2023.01)
*H04W 72/542* (2023.01)

(56) References Cited

U.S. PATENT DOCUMENTS

| | | | |
|---|---|---|---|
| 2019/0363919 A1* | 11/2019 | Bai | H04L 27/2605 |
| 2020/0067674 A1 | 2/2020 | Guan et al. | |
| 2020/0178134 A1 | 6/2020 | Yang et al. | |
| 2020/0351892 A1* | 11/2020 | Yi | H04L 5/0092 |
| 2021/0099263 A1* | 4/2021 | Cheng | H04W 72/046 |
| 2021/0409098 A1 | 12/2021 | Matsumura et al. | |
| 2022/0038244 A1 | 2/2022 | Zhang et al. | |
| 2022/0039123 A1 | 2/2022 | Wu et al. | |
| 2022/0210678 A1* | 6/2022 | Kim | H04L 5/0057 |
| 2022/0263557 A1* | 8/2022 | Gonuguntla | H04B 7/0695 |

FOREIGN PATENT DOCUMENTS

| | | | | |
|---|---|---|---|---|
| CN | 109802818 A | | 5/2019 | |
| CN | 110535592 A | | 12/2019 | |
| CN | 110536435 A | | 12/2019 | |
| CN | 110856258 A | | 2/2020 | |
| CN | 111385076 A | | 7/2020 | |
| EP | 3605935 A1 | * | 2/2020 | .......... H04B 7/0408 |
| WO | 2019/226442 A1 | | 11/2019 | |
| WO | 2020/090119 A1 | | 5/2020 | |
| WO | 2021/050060 A1 | | 3/2021 | |

OTHER PUBLICATIONS

Lenovo., et al., "Beam-management enhancements for NR from 52.6 GHz to 71GHz," 3GPP TSG RAN WG1 #104-e, R1-2100060, pp. 1-9, (Jan. 25-Feb. 5, 2021).
International Search Report and Written Opinion of the International Searching Authority dated Oct. 21, 2021 as received in Application No. PCT/CN2021/110255.
CN Office Action dated Jul. 1, 2022 as received in Application No. 202010780216.X.
Qualcomm Incorporated, "Enhancements on Multi-Beam Operation," 3GPP TSG-RAN WG1 Meeting #98, R1-1909273, Aug. 26-30, 2019, Prague, Czech, 19 pages.
Lenovo, Motorola Mobility, "Discussion of Multi-TRP/Panel Transmission," 3GPP TSG RAN WG1 Meeting #99, R1-1912316, Nov. 18-22, 2019, Reno, Las Vegas, USA, 11 pages.
Samsung, "Further Discussion Intra-Frequency Measurement Gap Design," 3GPP TSG RAN WG4 Meeting AH-1801, R4-1800200, Jan. 22-26, 2018, San Diego, California, USA, 2 pages.
3GPP TSG-RAN WG1 #101-e, Qualcomm Incorporated, "NR Using Existing D/UL NR Waveform to Support Operation Between 52.6 GHz and 71 GHz," e-Meeting, May 25-Jun. 5, 2020, R1-2004500.

* cited by examiner

200

S202

Perform signal transmission at a position of a target symbol by using a target transmission mode

Perform signal transmission at a position of a target symbol by using a target transmission mode, where the target reference signal includes a configured first RS and/or a second RS configured for performing first measurement

In a case that a serving cell of a terminal device satisfies a predetermined condition, perform signal transmission at a position of a target symbol by using a target transmission mode

SIGNAL TRANSMISSION METHOD, TERMINAL DEVICE, AND NETWORK DEVICE

CROSS-REFERENCE TO RELATED APPLICATIONS

The present application is a bypass continuation application of International Application No. PCT/CN2021/110255 filed on Aug. 3, 2021, which claims priority to Chinese Patent Application No. 202010780216.X, filed in China on Aug. 5, 2020 and entitled "SIGNAL TRANSMISSION METHOD, TERMINAL DEVICE, AND NETWORK DEVICE", which is incorporated herein by reference in its entirety.

TECHNICAL FIELD

Embodiments of this application relate to the field of communications technologies, and in particular, to a signal transmission method, a terminal device, and a network device.

BACKGROUND

A time for adjusting beam switching by a sending end or a receiving end is about 100 ns (nanoseconds), a largest subcarrier spacing (SCS) in frequency range (FR)1 & FR2 is 240 KHz, and a cyclic prefix (CP) length is about 292 ns; therefore, beam switching can usually be performed within the CP length.

In some scenarios of new radio (NR), due to a larger subcarrier spacing, a CP length of less than 100 ns is insufficient for beam switching.

SUMMARY

Embodiments of this application provide a signal transmission method, a terminal device, and a network device.

According to a first aspect, a signal transmission method is provided, the method is executed by a communications device, and the method includes: performing signal transmission at a position of a target symbol by using a target transmission mode, where the target transmission mode includes at least one of the following transmission modes: skipping performing target uplink transmission at the position of the target symbol; skipping performing target downlink transmission at the position of the target symbol; skipping performing, at the position of the target symbol, target uplink transmission with a TCI state different from that of target reference signal; or skipping performing, at the position of the target symbol, target downlink transmission with a TCI state different from that of the target reference signal; where the target symbol is a beam switching symbol of the target reference signal.

According to a second aspect, a signal transmission apparatus is provided, including: a transmission module, configured to perform signal transmission at a position of a target symbol by using a target transmission mode, where the target transmission mode includes at least one of the following transmission modes: skipping performing target uplink transmission at the position of the target symbol; skipping performing target downlink transmission at the position of the target symbol; skipping performing, at the position of the target symbol, target uplink transmission with a TCI state different from that of target reference signal; or skipping performing, at the position of the target symbol, target downlink transmission with a TCI state different from that of the target reference signal; where the target symbol is a beam switching symbol of the target reference signal.

According to a third aspect, a communications device is provided, where the communications device includes a processor, a memory, and a program or instructions stored in the memory and capable of running on the processor, and when the program or instructions are executed by the processor, the steps of the method according to the first aspect are implemented.

According to a fourth aspect, a readable storage medium is provided, where a program or instructions are stored in the readable storage medium, and when the program or instructions are executed by a processor, the steps of the method according to the first aspect are implemented.

According to a fifth aspect, a computer program product is provided, where the computer program product includes a processor, a memory, and a program or instructions stored in the memory and capable of running on the processor, and when the program or instructions are executed by the processor, the steps of the method according to the first aspect are implemented.

According to a sixth aspect, an embodiment of this application provides a chip, where the chip includes a processor and a communications interface, the communications interface is coupled to the processor, and the processor is configured to run a program or instructions to implement the method according to the first aspect.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application. In the accompanying drawings:

FIG. 2 is a schematic flowchart of a signal transmission method according to an embodiment of this application;

FIG. 3 is a schematic flowchart of a signal transmission method according to another embodiment of this application;

FIG. 4a is a schematic flowchart of a signal transmission method according to another embodiment of this application;

FIG. 4b is an example diagram of a signal transmission method according to an embodiment of this application;

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the terms used in this way is interchangeable in appropriate circumstances so that the embodiments of this application can be implemented in other orders than the order illustrated or described herein. In addition, "and/or" in this specification and claims indicates at least one of connected objects, and the symbol "/" generally indicates that the associated objects are in an "or" relationship.

It should be noted that technologies described in the embodiments of this application are not limited to a long term evolution (LTE) or LTE-Advanced (LTE-A) system, and may also be applied to other wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the sixth (6th Generation, 6G) communications system.

Figure 1:
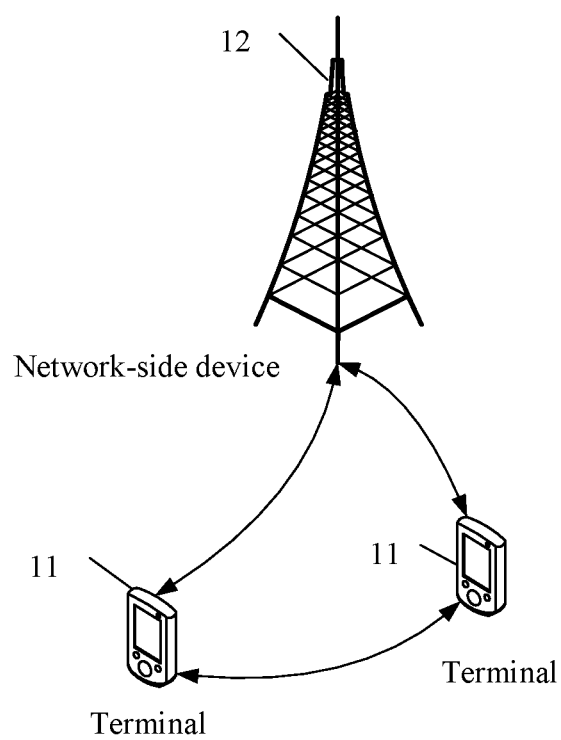
FIG. 1 is a block diagram of a wireless communications system to which the embodiments of this application are applicable.

FIG. 1 is a block diagram of a wireless communications system to which the embodiments of this application are applicable. The wireless communications system includes a terminal 11 and a network-side device 12. The terminal 11 may also be referred to as a terminal device or user terminal (User Equipment, UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that same technical effects are achieved, the base station is not limited to a specific technical term. It should be noted that in the embodiments of this application, the base station in the NR system is merely used as an example and a specific type of the base station is not limited.

The following describes in detail a signal transmission method provided in the embodiments of this application by using specific embodiments and application scenarios thereof with reference to the accompanying drawings.

As shown in FIG. 2, an embodiment of this application provides a signal transmission method 200, and the method may be executed by a terminal device and/or a network device, and the network device may be, for example, a base station. In other words, the method may be executed by software or hardware installed on the terminal device and/or the network device, and the method includes the following step.

S202: Perform signal transmission at a position of a target symbol by using a target transmission mode.

The target transmission mode may be configured or predefined. The target symbol is a beam switching symbol of the target reference signal.

The target transmission mode includes at least one of the following transmission modes:
  skipping performing target uplink transmission at the position of the target symbol, where, optionally, in a case that the communications device is UE, the UE skips sending a target uplink signal at the position of the target symbol, and in a case that the communications device is a network device, the network device skips receiving a target uplink signal at the position of the target symbol;
  skipping performing target downlink transmission at the position of the target symbol, where, optionally, in a case that the communications device is UE, the UE skips receiving a target downlink signal at the position of the target symbol, and in a case that the communications device is a network device, the network device skips sending a target downlink signal at the position of the target symbol;
  skipping performing, at the position of the target symbol, target uplink transmission with a transmission configuration indicator (TCI) state different from that of the target reference signal; or
  skipping performing, at the position of the target symbol, target downlink transmission with a TCI state different from that of the target reference signal.

According to the signal transmission method provided in this embodiment of this application, signal transmission is performed at the position of the target symbol by using the target transmission mode, where the target transmission mode includes at least one of the following transmission modes: skipping performing target uplink transmission at the position of the target symbol; skipping performing target downlink transmission at the position of the target symbol; skipping performing, at the position of the target symbol, target uplink transmission with a TCI state different from that of target reference signal; or skipping performing, at the position of the target symbol, target downlink transmission with a TCI state different from that of the target reference signal; where the target symbol is a beam switching symbol of the target reference signal. In this way, the target symbol can be used as a reserved spacing symbol, to reserve sufficient switching time for beam switching.

As shown in FIG. 3, an embodiment of this application provides a signal transmission method 300, and the method may be executed by a terminal device and/or a network device, and the network device may be, for example, a base station. In other words, the method may be executed by software or hardware installed on the terminal device and/or the network device. The method includes the following step.

S302: Perform signal transmission at a position of a target symbol by using a target transmission mode, where the target reference signal includes a configured first reference signal and/or a second reference signal configured for performing first measurement.

The target transmission mode includes at least one of the following transmission modes: skipping performing target uplink transmission at the position of the target symbol; skipping performing target downlink transmission at the position of the target symbol; skipping performing, at the position of the target symbol, target uplink transmission with a TCI state different from that of target reference signal; or skipping performing, at the position of the target symbol, target downlink transmission with a TCI state different from that of the target reference signal.

Similar descriptions of step S202 in the embodiment of FIG. 2 can be used in this step, and repeated parts are not described herein again.

In an implementation, the UE does not expect to perform target uplink transmission at a target symbol position related to the first RS or the second RS. Optionally, in an implementation, the target uplink transmission includes one or more of the following transmissions: physical uplink shared channel (PUSCH), physical uplink control channel (PUCCH), sounding reference signal (SRS), and physical random access channel (PRACH).

Optionally, in a case that the communications device is UE, the UE skips sending target uplink transmission at the target symbol position related to the first RS or the second RS; and in a case that the communications device is a network device, the network device skips receiving target uplink transmission at the target symbol position related to the first RS or the second RS, so that the UE and the network device have the same understanding on transmission timing.

In an implementation, the UE does not expect to receive target downlink transmission at the target symbol position related to the first RS or the second RS, and the target downlink transmission includes one or more of the following transmissions: physical downlink control channel (PDCCH), physical downlink shared channel (PDSCH), phase tracking reference signal (PTRS), and CSI-RS. In an implementation, the CSI-RS includes at least one of the following types: tracking reference signal (TRS), channel state information (CSI), or tracking CSI.

Optionally, in a case that the communications device is UE, the UE skips receiving target downlink transmission at the target symbol position related to the first RS or the second RS; and in a case that the communications device is a network device, the network device skips sending target downlink transmission at the target symbol position related to the first RS or the second RS.

In an implementation, the UE does not expect to perform, at the target symbol position related to the first RS or the second RS, target uplink transmission with a TCI state different from that of the first RS or the second RS. Optionally, in an implementation, the target uplink transmission includes one or more of the following transmissions: PUSCH, PUCCH, SRS, and PRACH.

Optionally, in a case that the communications device is UE, the UE skips sending, at the target symbol position related to the first RS or the second RS, target uplink transmission with a TCI state different from that of the first RS or the second RS; and in a case that the communications device is a network device, the network device skips receiving, at the target symbol position related to the first RS or the second RS, target uplink transmission with a TCI state different from that of the first RS or the second RS.

In an implementation, the UE does not expect to receive, at the target symbol position related to the first RS or the second RS, target downlink transmission with a TCI state different from that of the first RS or the second RS. The target downlink transmission includes one or more of the following transmissions: PDCCH, PDSCH, PTRS, and CSI-RS. In an implementation, the CSI-RS includes at least one of the following types: TRS, CSI, or tracking CSI.

Optionally, in a case that the communications device is UE, the UE skips receiving, at the target symbol position related to the first RS or the second RS, target downlink transmission with a TCI state different from that of the first RS or the second RS; and in a case that the communications device is a network device, the network device skips sending, at the target symbol position related to the first RS or the second RS, target downlink transmission with a TCI state different from that of the first RS or the second RS.

In an implementation, the beam switching symbol of the target reference signal includes at least one of the following symbols:
 a target reference signal symbol, that is, a symbol of the configured first RS and/or a symbol of the second RS configured for performing first measurement;
 N symbols before or after the target reference signal symbol, where N is a positive integer, for example, being 3 symbols before the configured first RS symbol, or the like, and a value of N may be predefined or configured;
 N symbols before or after consecutive target reference signal symbols, where N is a positive integer, for example, the target reference signal may be synchronization signal block (Synchronization Signal and PBCH block, SSB) or CSI-RS, the beam switching symbol of the target reference signal may be: N symbols before or after consecutive SSBs or CSI-RSs, and a value of N may be predefined or configured; or
 a predetermined symbol in a target spacing symbol, where the target spacing symbol is at least one of the following spacing symbols:
 a spacing symbol between consecutive target reference signals, for example, a spacing symbol between SSBs corresponding to consecutive SSB indexes, where the SSBs may be indicated as actually sent SSBs;
 a spacing symbol between consecutive target reference signals with different quasi-co-location (Quasi co-location, QCL) assumptions, for example, a spaced symbol between CSI-RSs of different QCL assumptions; or
 a spacing symbol between repeated target reference signals with a quasi-co-location assumption.

The predetermined symbols may be all or part of spacing symbols, and the predetermined symbol may be predefined or configured.

In an implementation, the first measurement includes at least one of the following: intra-frequency measurement of SS reference signal received power (Synchronization Signal based Reference Signal Received Power, SS-RSRP), intra-frequency measurement of SS signal to interference plus noise ratio (SS signal-to-noise and interference ratio, SS-SINR), intra-frequency measurement of reference signal received quality (RSRQ), L1 reference signal received power (L1-RSRP) measurement, radio link monitoring, beam failure detection, or candidate beam detection.

In an implementation, the target RS includes: synchronization signal block (Synchronization Signal and PBCH block, SSB) and/or CSI reference signal (CSI-RS).

In an implementation, different first measurements may correspond to different second RSs.

According to the signal transmission method provided by this embodiment of this application, target uplink transmission or target downlink transmission is not performed at the target symbol position related to the target RS, or target uplink transmission or target downlink transmission with a TCI state different from that of the target RS, so as to reserve sufficient switching time for beam switching.

As shown in FIG. 4a, an embodiment of this application provides a signal transmission method 400. The method may be executed by a terminal device and/or a network device, and the network device may be, for example, a base station. In other words, the method may be executed by software or hardware installed on the terminal device and/or the network device. The method includes the following step.

S402: In a case that a serving cell of the terminal device satisfies a predetermined condition, perform signal transmission at a position of a target symbol by using a target transmission mode.

The predetermined condition includes at least one of the following conditions: the serving cell is located within a predetermined frequency range; or an SCS of the serving cell or its active BWP is a predetermined SCS. For example, the predetermined frequency range may be greater than 52.6 GHz, and the predetermined SCS may be 960 KHz.

When new radio (NR) operates in a high frequency band (for example, >52.6 GHz), due to an increase in a subcarrier spacing (for example, 960 KHz), a CP length of only 73 ns is insufficient for beam switching. In this case, the target transmission mode described in the embodiment of FIG. 2 or FIG. 3 is used to perform signal transmission at the target symbol position related to the target RS. Target uplink transmission or target downlink transmission is not performed at the target symbol position related to the target RS, or target uplink transmission or target downlink transmission with a TCI state different from that of the target RS is not performed, so that the target symbol can be used as a reserved spacing symbol when the serving cell of the terminal device operates in a high frequency band, so as to reserve enough switching time for beam switching.

Some examples are given below.

Figure 4B:
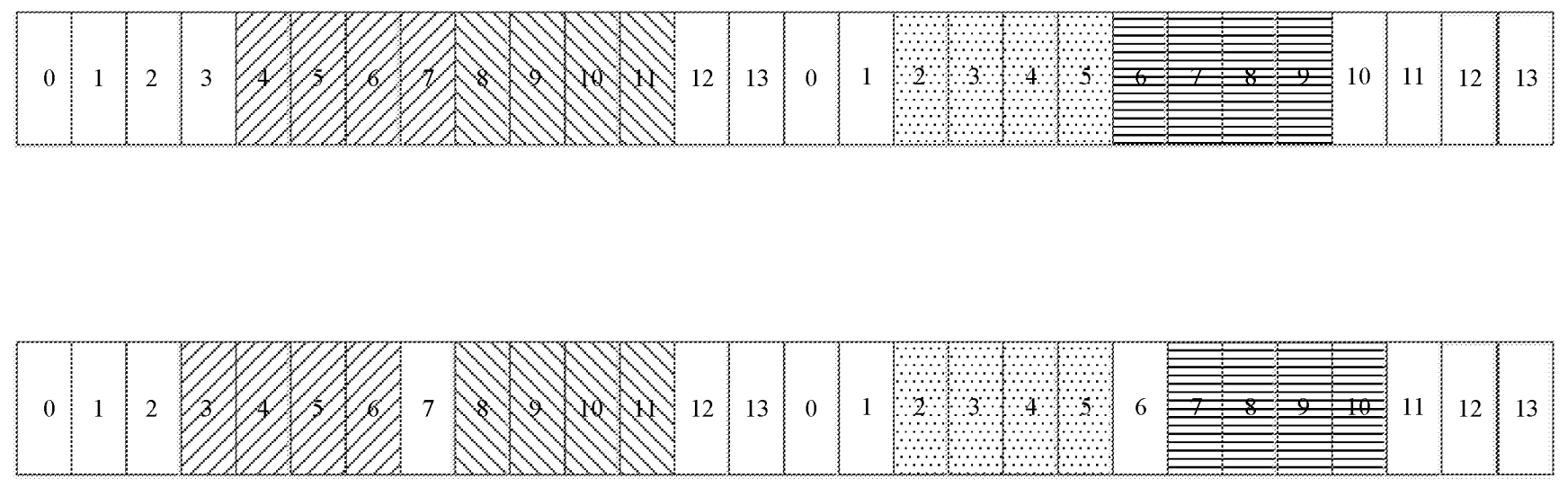

Example 1: When an operating frequency is 52.6-71 GHz, and/or an SSB SCS on an operating carrier or BWP is 480 K, 960 K, or above, assuming that an SSB mode is adjusted as shown in FIG. 4b and all SSBs are indicated for transmission, uplink transmission and/or downlink reception cannot be performed in a symbol 7 between SSB1 and SSB2 and a symbol 6 between SSB3 and SSB4.

Optionally, the UE does not expect to receive, in a symbol before/after an actually sent SSB, PDCCH, PDSCH, CSI-RS, or the like with a TCI state different from that of the SSB.

Optionally, the target transmission mode may be configured by using system information or radio resource control (RRC) based on a capability of the base station or a capability of the UE.

Example 2: When an operating frequency is 52.6-71 GHz, and/or an SSB SCS on an operating carrier or BWP is 480 K, 960 K, or above, for the following cases: an RS for L1-RSRP measurement, radio link monitoring, beam failure detection, or candidate beam detection is a CSI-RS and has a QCL relationship with a TCI state of a current PDCCH or PDSCH, and repetition transmission is not performed, the target transmission mode is not used for signal transmission at the target symbol position related to the target reference signal.

Anyway, the UE does not expect to perform transmission of PUCCH, PUSCH, or SRS and reception of PDCCH, PDSCH, TRS, CSI-RS for CQI, or CSI-RS for tracking on a symbol between an SSB or CSI-RS symbol to be measured and an SSB or CSI-RS configured with different QCL.

If the following conditions are satisfied:
(a) the UE receives paging information for notifying system information update; and
b) the Type 2 CSS PDCCH and Type 0 PDCCH in a notification received by the UE are greater than 2 slots;
when pattern 3 is used for SSB-control resource set (coreset) multiplexing, the UE expects to receive a Type 0 (Type0) Common Search Space (CSS) PDCCH and a corresponding scheduled PDSCH on an SSB symbol to be measured; and
when pattern 2 is used for SSB-coreset multiplexing, the UE expects to perform, on the SSB symbol to be measured, PDSCH reception scheduled by Type 0 CSS PDCCH.

Figure 5:
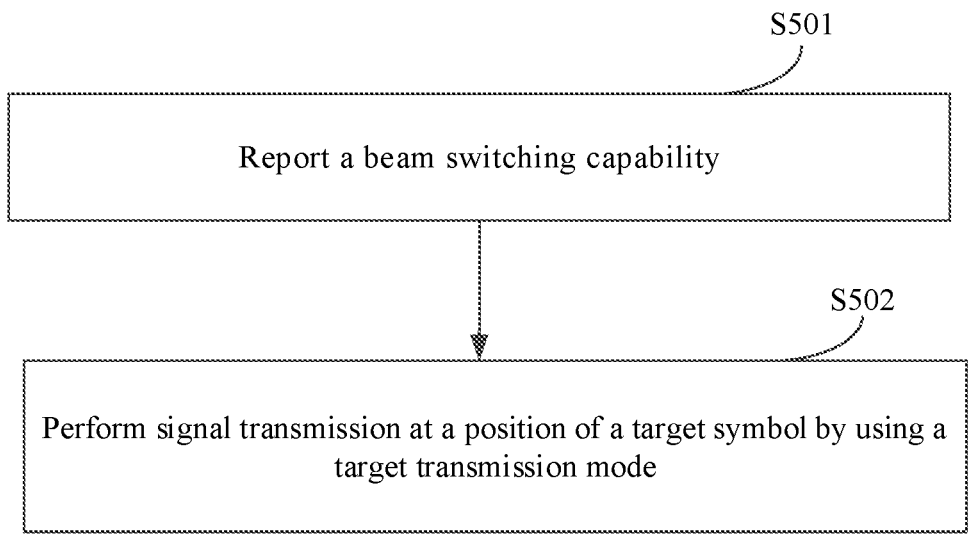
FIG. 5 is a schematic flowchart of a signal transmission method according to another embodiment of this application.

As shown in FIG. 5, an embodiment of this application provides a signal transmission method 500, and the method may be executed by a terminal device and/or a network device, and the network device may be, for example, a base station. In other words, the method may be executed by software or hardware installed on the terminal device and/or the network device. The method includes the following steps.

S501: Report a beam switching capability.

The beam switching capability is used to indicate whether to reserve a symbol for beam switching, in other words, whether to perform signal transmission at a position of a target symbol by using a target transmission mode.

In an implementation, the reporting a beam switching capability includes at least one of the following:
reporting a value of N, where the value of N is used to indicate reserving a symbol for beam switching and a length of the reserved symbol, and the base station may perform corresponding configuration based on the reported capability; or
reporting whether multi-panel is supported, where whether multi-panel is supported is used to indicate whether to reserve a symbol for beam switching, and the base station implicitly determines or configures terminal scheduling behavior based on whether the terminal supports the multi-panel capability.

S502: Perform signal transmission at a position of a target symbol by using a target transmission mode.

The target transmission mode includes at least one of the following transmission modes:
skipping performing target uplink transmission at the position of the target symbol;
skipping performing target downlink transmission at the position of the target symbol, where,
skipping performing, at the position of the target symbol, target uplink transmission with a transmission configuration indicator (TCI) state different from that of the target reference signal; or
skipping performing, at the position of the target symbol, target downlink transmission with a TCI state different from that of the target reference signal.

Similar descriptions of step S202 in the embodiment in FIG. 2, step S302 in the embodiment in FIG. 3, or step S402 in the embodiment in FIG. 4 can be used in this step to achieve similar effects, and repeated parts are not described herein again.

Figure 6:
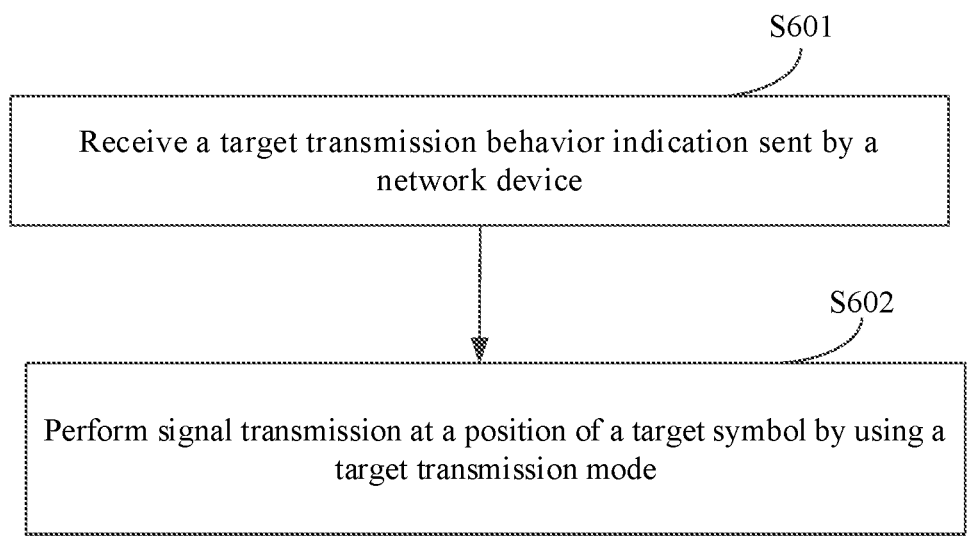
FIG. 6 is a schematic flowchart of a signal transmission method according to another embodiment of this application.

As shown in FIG. 6, an embodiment of this application provides a signal transmission method 600, and the method may be executed by a terminal device and/or a network device, and the network device may be, for example, a base station. In other words, the method may be executed by software or hardware installed on the terminal device and/or the network device. The method includes the following steps.

S601: Receive a target transmission behavior indication sent by the network device.

The target transmission behavior indication is used to indicate whether to perform, by using a target transmission mode, signal transmission at a target symbol position related to a target reference signal.

In the case that the target transmission behavior indication sent by the network device is received, the following steps are performed; otherwise, the following steps may not be performed.

In an implementation, before this step, a step of reporting a beam switching capability by UE is also included. The specific step is similar to step S501 in the embodiment of FIG. 5, and is not repeated. The network device sends the target transmission behavior indication in this step based on the beam switching capability of the UE.

S602: Perform signal transmission at a position of a target symbol by using a target transmission mode.

The target transmission mode includes at least one of the following transmission modes:
  skipping performing target uplink transmission at the position of the target symbol;
  skipping performing target downlink transmission at the position of the target symbol;
  skipping performing, at the position of the target symbol, target uplink transmission with a TCI state different from that of target reference signal; or
  skipping performing, at the position of the target symbol, target downlink transmission with a TCI state different from that of the target reference signal.

Similar descriptions of step S202 in the embodiment in FIG. 2, step S302 in the embodiment in FIG. 3, step S402 in the embodiment in FIG. 4, or step S502 in the embodiment in FIG. 5 can be used in this step, and repeated parts are not described herein again.

It should be noted that, for the signal transmission method provided in the embodiments of this application, the execution body may be a signal transmission apparatus, or a control module for executing the method in the apparatus. In this embodiment of this application, the signal transmission method provided in the embodiments of this application is described by using the signal transmission method being executed by the signal transmission apparatus as an example.

Figure 7:
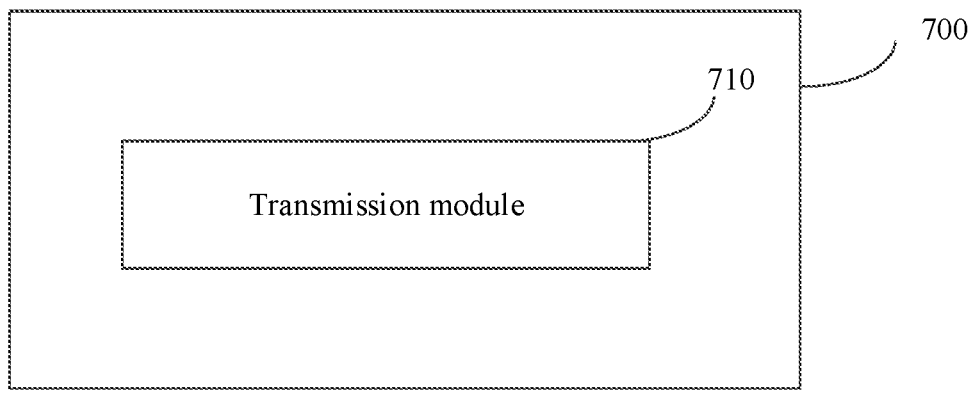
FIG. 7 is a schematic structural diagram of a signal transmission apparatus according to an embodiment of this application.

FIG. 7 is a schematic structural diagram of a signal transmission apparatus according to an embodiment of this application. As shown in FIG. 7, the signal transmission apparatus 700 includes a transmission module 710.

The transmission module 710 is configured to perform signal transmission at a position of a target symbol by using a target transmission mode, where the target transmission mode includes at least one of the following transmission modes: skipping performing target uplink transmission at the position of the target symbol; skipping performing target downlink transmission at the position of the target symbol; skipping performing, at the position of the target symbol, target uplink transmission with a transmission configuration indicator TCI state different from that of the target reference signal; or skipping performing, at the position of the target symbol, target downlink transmission with a TCI state different from that of the target reference signal.

The target symbol is a beam switching symbol of the target reference signal.

In an implementation, the target reference signal is a configured first reference signal and/or a second reference signal configured for performing first measurement, and the beam switching symbol of the target reference signal includes at least one of the following symbols: a target reference signal symbol; N symbols before or after the target reference signal symbol; N symbols before or after consecutive target reference signal symbols, where N is a positive integer; or a predetermined symbol in a target spacing symbol, where the target spacing symbol is at least one of the following spacing symbols: a spacing symbol between consecutive target reference signals; a spacing symbol between consecutive target reference signals with different quasi-co-location assumptions; or a spacing symbol between repeated target reference signals with a quasi-co-location assumption.

In an implementation, the first measurement includes at least one of the following: intra-frequency measurement of SS-RSRP; intra-frequency measurement of SS-SINR; intra-frequency measurement of RSRQ; L1-RSRP measurement; radio link monitoring; beam failure detection; or candidate beam detection.

In an implementation, different first measurements correspond to different second reference signals.

In an implementation, before performing signal transmission at the position of the target symbol, the transmission module 710 is further configured to report a beam switching capability, where the beam switching capability is used to indicate whether to reserve a symbol for beam switching.

In an implementation, the reporting a beam switching capability includes at least one of the following: reporting a value of N, where the value of N is used to indicate reserving a symbol for beam switching and a length of the reserved symbol; or reporting whether multi-panel is supported, where whether multi-panel is supported is used to indicate whether to reserve a symbol for beam switching.

In an implementation, the transmission module 710 is further configured to: before performing signal transmission at the position of the target symbol, receive a target transmission behavior indication sent by a network device, where the target transmission behavior indication is used to indicate whether to perform, by using the target transmission mode, signal transmission at a target symbol position related to the target reference signal.

In an implementation, the target uplink transmission includes one or more of the following transmissions: PUSCH, PUCCH, SRS, and PRACH; and/or the target downlink transmission includes one or more of the following transmissions: PDCCH, PDSCH, PTRS, and CSI-RS.

In an implementation, the CSI-RS includes at least one of the following types: TRS, CSI, or tracking CSI.

In an implementation, the transmission module 710 is configured to: in a case that a serving cell of a terminal device satisfies a predetermined condition, perform signal transmission at the position of the target symbol by using the target transmission mode; where the predetermined condition includes at least one of the following conditions: the serving cell is located within a predetermined frequency range; or an SCS of the serving cell or its active BWP is a predetermined SCS.

The signal transmission apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage NAS), a personal computer (PC), a television (TV), a teller machine, a self-service machine, or the like. This is not specifically limited in the embodiments of this application.

The signal transmission apparatus in this embodiment of this application may be an apparatus with an operating system. The operating system may be an Android operating system, an iOS operating system, or other possible operating systems, and is not specifically limited in the embodiments of this application.

For the apparatus 700 in this embodiment of this application, refer to the processes of the methods 200-600 in the corresponding embodiment of this application, and the units or modules of the apparatus 700 and other operations and/or functions described above are used to implement the corresponding processes in the methods 200-600, with the same or equivalent technical effects achieved. For brevity, details are not repeated herein.

Figure 8:
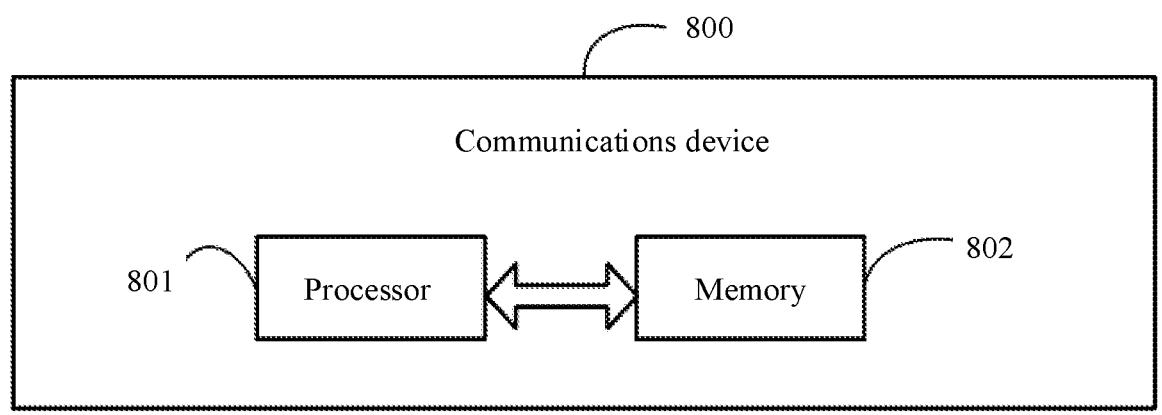
FIG. 8 is a schematic structural diagram of a communications device according to an embodiment of this application.

Optionally, as shown in FIG. 8, an embodiment of this application further provides a communications device 800, including a processor 801, a memory 802, and a program or instructions stored in the memory 802 and capable of running on the processor 801. For example, when the communications device 800 is a terminal and when the program or instructions are executed by the processor 801, the processes of the foregoing embodiment of the signal transmission method are implemented, with the same technical effects achieved. When the communications device 800 is a network-side device and when the program or instructions are executed by the processor 801, the processes of the foregoing embodiment of the signal transmission method are implemented, with the same technical effects achieved. To avoid repetition, details are not described herein again.

Figure 9:
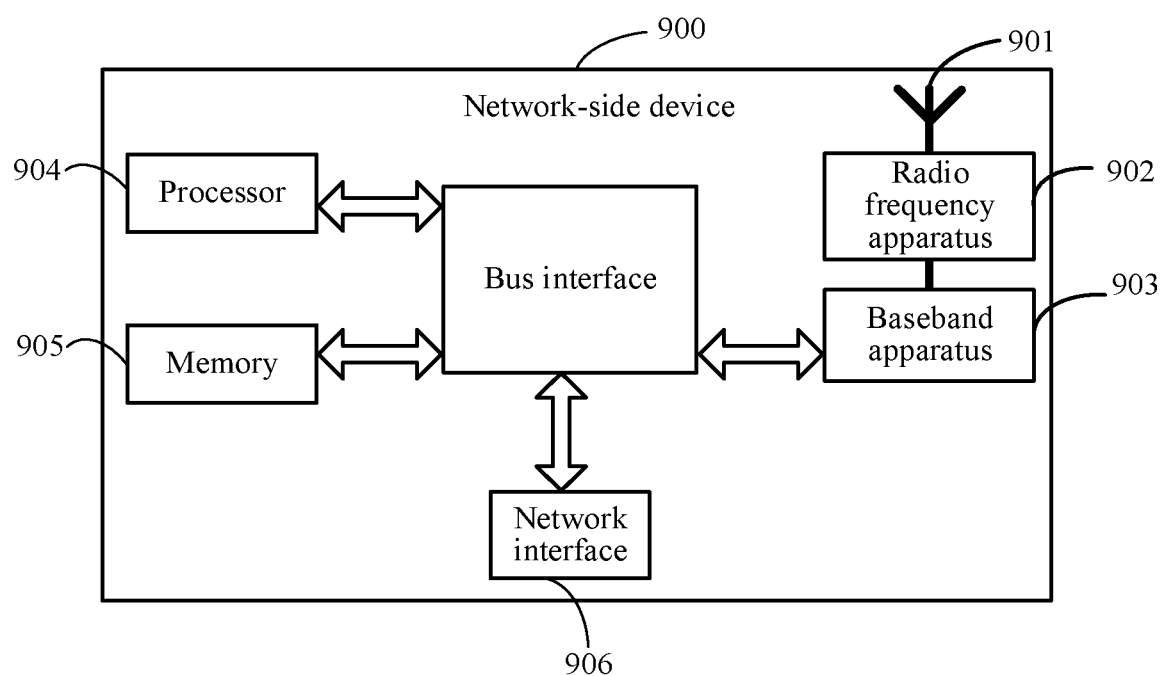
FIG. 9 is a schematic structural diagram of a network device according to another embodiment of this application.

Specifically, an embodiment of this application further provides a network-side device. As shown in FIG. 9, the network-side device 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and sends the received information to the baseband apparatus 903 for processing. In a downlink direction, the baseband apparatus 903 processes to-be-sent information, and sends the information to the radio frequency apparatus 902; and the radio frequency apparatus 902 processes the received information and then sends the information out by using the antenna 901.

The frequency band processing apparatus may be located in the baseband apparatus 903. The method performed by the network-side device in the foregoing embodiment may be implemented in the baseband apparatus 903, and the baseband apparatus 903 includes a processor 904 and a memory 905.

The baseband apparatus 903 may include, for example, at least one baseband board, where a plurality of chips are disposed on the baseband board. As shown in FIG. 9, one of the chips is, for example, the processor 904, connected to the memory 905, to invoke a program in the memory 905 to perform the operation of the network device shown in the foregoing method embodiment.

The baseband apparatus 903 may further include a network interface 906, configured to exchange information with the radio frequency apparatus 902, where the interface is, for example, a common public radio interface (CPRI).

Specifically, the network-side device in this embodiment of this application further includes: instructions or a program stored in the memory 905 and capable of running on the processor 904. The processor 904 invokes the instructions or program in the memory 905 to execute the following operation: performing signal transmission at a position of a target symbol by using a target transmission mode, where the target transmission mode includes at least one of the following transmission modes: skipping performing target uplink transmission at the position of the target symbol; skipping performing target downlink transmission at the position of the target symbol; skipping performing, at the position of the target symbol, target uplink transmission with a transmission configuration indicator TCI state different from that of the target reference signal; or skipping performing, at the position of the target symbol, target downlink transmission with a TCI state different from that of the target reference signal; where the target symbol is a beam switching symbol of the target reference signal.

In an implementation, the target reference signal is a configured first reference signal and/or a second reference signal configured for performing first measurement, and the beam switching symbol of the target reference signal includes at least one of the following symbols: a target reference signal symbol; N symbols before or after the target reference signal symbol; N symbols before or after consecutive target reference signal symbols, where N is a positive integer; or a predetermined symbol in a target spacing symbol, where the target spacing symbol is at least one of the following spacing symbols: a spacing symbol between consecutive target reference signals; a spacing symbol between consecutive target reference signals with different quasi-co-location assumptions; or a spacing symbol between repeated target reference signals with a quasi-co-location assumption.

In an implementation, the first measurement includes at least one of the following: intra-frequency measurement of SS-RSRP; intra-frequency measurement of SS-SINR; intra-frequency measurement of RSRQ; L1-RSRP measurement; radio link monitoring; beam failure detection; or candidate beam detection.

In an implementation, different first measurements correspond to different second reference signals.

In an implementation, before performing signal transmission at the position of the target symbol, the processor further performs the following: reporting a beam switching capability, where the beam switching capability is used to indicate whether to reserve a symbol for beam switching.

In an implementation, the reporting a beam switching capability includes at least one of the following: reporting a value of N, where the value of N is used to indicate reserving a symbol for beam switching and a length of the reserved symbol; or reporting whether multi-panel is supported, where whether multi-panel is supported is used to indicate whether to reserve a symbol for beam switching.

In an implementation, before performing signal transmission at the position of the target symbol, the processor further performs the following: receiving a target transmission behavior indication sent by a network device, where the target transmission behavior indication is used to indicate whether to perform, by using the target transmission mode, signal transmission at a target symbol position related to the target reference signal.

In an implementation, the target uplink transmission includes one or more of the following transmissions: PUSCH, PUCCH, SRS, and PRACH; and/or the target downlink transmission includes one or more of the following transmissions: PDCCH, PDSCH, PTRS, and CSI-RS.

In an implementation, the CSI-RS includes at least one of the following types: TRS, CSI, or tracking CSI.

In an implementation, in a case that a serving cell of a terminal device satisfies a predetermined condition, the processor performs signal transmission at the position of the target symbol by using the target transmission mode; where the predetermined condition includes at least one of the following conditions: the serving cell is located within a predetermined frequency range; or an SCS of the serving cell or its active BWP is a predetermined SCS.

The specific implementation method is the method described in the embodiments of FIG. 2 to FIG. 5, with the same technical effects achieved. To avoid repetition, details are not repeated herein.

Figure 10:
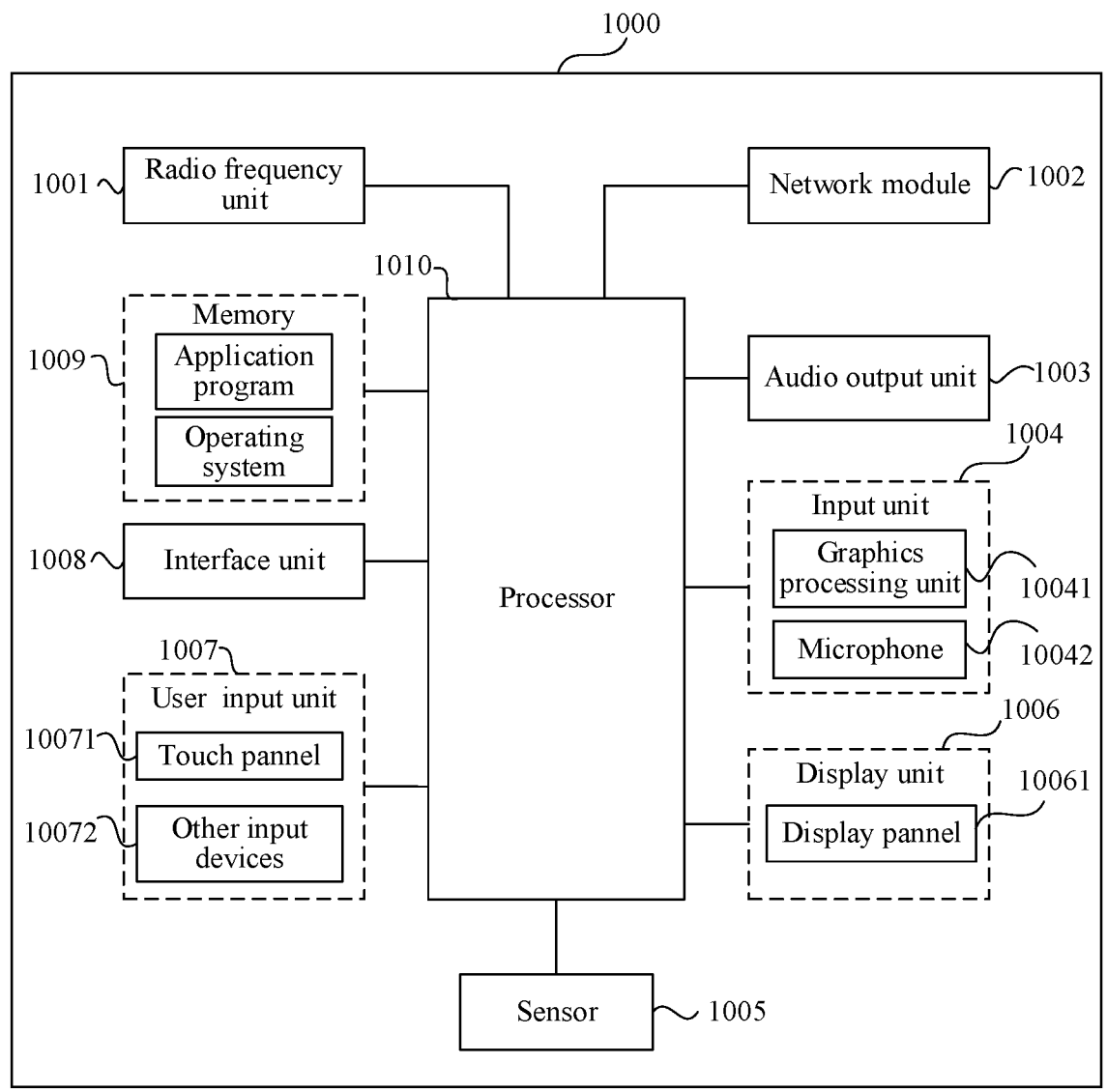
FIG. 10 is a schematic structural diagram of a terminal device according to another embodiment of this application.

FIG. 10 is a schematic diagram of a hardware structure of a terminal device for implementing the embodiments of this application.

The terminal device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

Persons skilled in the art can understand that the terminal device 1000 may further include a power supply (for example, a battery) supplying power to all components, and the power supply may be logically connected to the processor 1010 through a power management system. In this way, functions such as charge management, discharge management, and power consumption management are implemented by using the power management system. The structure of the terminal device shown in FIG. 10 does not constitute any limitation on the terminal device. The terminal device may include more or fewer components than shown in the figure, or a combination of some components, or the components disposed differently. Details are not described herein again.

It should be understood that in this embodiment of this application, the input unit 1004 may include a graphics processing unit (GPU) 10041 and a microphone 10042. The graphics processing unit 10041 processes image data of a still picture or video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, and the like. The user input unit 1007 may include a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or a power on/off key), a trackball, a mouse, a joystick, and the like. Details are not described herein.

In this embodiment of this application, the radio frequency unit 1001 receives downlink data from a network-side device, and then sends the downlink data to the processor 1010 for processing; and also sends uplink data to the network-side device. Generally, the radio frequency unit 1001 includes but is not limited to an antenna, at least one amplifier, a transceiver, a coupler, a low noise amplifier, a duplexer, and the like.

The memory 1009 may be configured to store software programs or instructions and various data. The memory 1009 may include a program or instruction storage area and a data storage area. The program or instruction storage area may store an operating system, an application program or instructions required by at least one function (for example, a sound playback function or an image playback function), and the like. In addition, the memory 1009 may include a high-speed random access memory, and may further include a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory, for example, at least one disk storage device, a flash memory device, or another volatile solid-state storage device.

The processor 1010 may include one or more processing units. Optionally, an application processor and a modem processor may be integrated in the processor 1010. The application processor primarily processes an operating system, user interfaces, application programs or instructions, and the like. The modem processor primarily processes radio communication, such as a baseband processor. It can be understood that the modem processor may alternatively be not integrated in the processor 1010.

The processor 1010 is configured to:

perform signal transmission at a position of a target symbol by using a target transmission mode, where the target transmission mode includes at least one of the following transmission modes: skipping performing target uplink transmission at the position of the target symbol; skipping performing target downlink transmission at the position of the target symbol; skipping performing, at the position of the target symbol, target uplink transmission with a TCI state different from that of target reference signal; or skipping performing, at the position of the target symbol, target downlink transmission with a transmission configuration indicator TCI state different from that of the target reference signal; where the target symbol is a beam switching symbol of the target reference signal.

In an implementation, the target reference signal is a configured first reference signal and/or a second reference signal configured for performing first measurement, and the beam switching symbol of the target reference signal includes at least one of the following symbols: a target reference signal symbol; N symbols before or after the target reference signal symbol; N symbols before or after consecutive target reference signal symbols, where N is a positive integer; or a predetermined symbol in a target spacing symbol, where the target spacing symbol is at least one of the following spacing symbols: a spacing symbol between consecutive target reference signals; a spacing symbol between consecutive target reference signals with different quasi-co-location assumptions; or a spacing symbol between repeated target reference signals with a quasi-co-location assumption.

In an implementation, the first measurement includes at least one of the following: intra-frequency measurement of SS-RSRP; intra-frequency measurement of SS-SINR; intra-frequency measurement of RSRQ; L1-RSRP measurement; radio link monitoring; beam failure detection; or candidate beam detection.

In an implementation, different first measurements correspond to different second reference signals.

In an implementation, before performing signal transmission at the position of the target symbol, the processor further performs the following: reporting a beam switching capability, where the beam switching capability is used to indicate whether to reserve a symbol for beam switching.

In an implementation, the reporting a beam switching capability includes at least one of the following: reporting a value of N, where the value of N is used to indicate reserving a symbol for beam switching and a length of the reserved symbol; or reporting whether multi-panel is supported, where whether multi-panel is supported is used to indicate whether to reserve a symbol for beam switching.

In an implementation, before performing signal transmission at the position of the target symbol, the processor further performs the following: receiving a target transmission behavior indication sent by a network device, where the target transmission behavior indication is used to indicate whether to perform, by using the target transmission mode, signal transmission at a target symbol position related to the target reference signal.

In an implementation, the target uplink transmission includes one or more of the following transmissions: PUSCH, PUCCH, SRS, and PRACH; and/or the target downlink transmission includes one or more of the following transmissions: PDCCH, PDSCH, PTRS, and CSI-RS.

In an implementation, the CSI-RS includes at least one of the following types: TRS, CSI, or tracking CSI.

In an implementation, in a case that a serving cell of the terminal device satisfies a predetermined condition, the processor performs signal transmission at the position of the target symbol by using the target transmission mode. The predetermined condition includes at least one of the following conditions: the serving cell is located within a predetermined frequency range; or an SCS of the serving cell or its active BWP is a predetermined SCS.

For the terminal device 1000 in this embodiment of this application, refer to the processes of the methods 200-600 in the corresponding embodiment of this application, and the units or modules of the terminal device 1000 and other operations and/or functions described above are used to implement the corresponding processes in the methods 200-600, with the same or equivalent technical effects achieved. For brevity, details are not repeated herein.

An embodiment of this application further provides a readable storage medium, where a program or instructions are stored in the readable storage medium. When the program or instructions are executed by a processor, the processes of the foregoing embodiment of the signal transmission method can be implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or instructions to implement the processes of the foregoing signal transmission method embodiments, with the same technical effects achieved. To avoid repetition, details are not repeated herein.

It should be understood that the chip mentioned in the embodiments of this application may also be referred to as a system-level chip, a system chip, a chip system, a system-on-chip, or the like.

An embodiment of this application provides a computer program product, where the computer program product includes a processor, a memory, and a program or instructions stored in the memory and capable of running on the processor, and when the program or instructions are executed by the processor, the steps of the method are implemented.

It should be noted that in this specification, the term "include", "comprise", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A signal transmission method, wherein the method is executed by a communications device, comprising:
performing signal transmission at a position of a target symbol by using a target transmission mode, wherein the target transmission mode comprises at least one of the following transmission modes:
skipping performing target uplink transmission at the position of the target symbol;
skipping performing target downlink transmission at the position of the target symbol;
skipping performing, at the position of the target symbol, target uplink transmission with a TCI state different from that of target reference signal; or
skipping performing, at the position of the target symbol, target downlink transmission with a TCI state different from that of the target reference signal; wherein
the target symbol is a beam switching symbol of the target reference signal;
wherein the target reference signal is a configured first reference signal and/or a second reference signal configured for performing first measurement, and the beam switching symbol of the target reference signal comprises at least one of the following symbols:
N symbols before or after the target reference signal symbol, wherein N is an integer, and N>1;
N symbols before or after consecutive target reference signal symbols, wherein N is an integer, and N>0; or
a predetermined symbol in a target spacing symbol, wherein the target spacing symbol is at least one of the following spacing symbols:
a spacing symbol between consecutive target reference signals;
a spacing symbol between consecutive target reference signals with different quasi-co-location assumptions; or
a spacing symbol between repeated target reference signals with a quasi-co-location assumption.

2. The method according to claim 1, wherein the first measurement comprises at least one of the following:
intra-frequency measurement of SS-RSRP;
intra-frequency measurement of SS-SINR;
intra-frequency measurement of RSRQ;
L1-RSRP measurement;
radio link monitoring;
beam failure detection; or
candidate beam detection.

3. The method according to claim 1, wherein different first measurements correspond to different second reference signals.

4. The method according to claim 1, wherein before the performing signal transmission at a position of a target symbol, the method further comprises:
reporting a beam switching capability, wherein the beam switching capability is used to indicate whether to reserve a symbol for beam switching.

5. The method according to claim 4, wherein the reporting a beam switching capability comprises at least one of the following:
reporting a value of N, wherein the value of N is used to indicate reserving a symbol for beam switching and a length of the reserved symbol; or
reporting whether multi-panel is supported, wherein whether multi-panel is supported is used to indicate whether to reserve a symbol for beam switching.

6. The method according to claim 1, wherein before the performing signal transmission at a position of a target symbol, the method further comprises:
receiving a target transmission behavior indication sent by a network device, wherein the target transmission behavior indication is used to indicate whether to perform, by using the target transmission mode, signal transmission at a target symbol position related to the target reference signal.

7. The method according to claim 1, wherein the target uplink transmission comprises one or more of the following transmissions:
PUSCH, PUCCH, SRS, and PRACH; and/or
the target downlink transmission comprises one or more of the following transmissions: PDCCH, PDSCH, PTRS, and CSI-RS.

8. The method according to claim 7, wherein the CSI-RS comprises at least one of the following types:
TRS, CSI, or tracking CSI.

9. The method according to claim 1, before the performing signal transmission at a position of a target symbol by using a target transmission mode, comprising:
in a case that a serving cell of a terminal device satisfies a predetermined condition, performing signal transmission at the position of the target symbol by using the target transmission mode; wherein
the predetermined condition comprises at least one of the following conditions:
the serving cell is located within a predetermined frequency range; or
an SCS of the serving cell or its active BWP is a predetermined SCS.

10. A communications device, comprising a processor, a memory, and a program or instructions stored in the memory and capable of running on the processor, wherein when the program or instructions are executed by the processor, the following steps of are implemented:
performing signal transmission at a position of a target symbol by using a target transmission mode, wherein the target transmission mode comprises at least one of the following transmission modes:
skipping performing target uplink transmission at the position of the target symbol;
skipping performing target downlink transmission at the position of the target symbol;
skipping performing, at the position of the target symbol, target uplink transmission with a TCI state different from that of target reference signal; or
skipping performing, at the position of the target symbol, target downlink transmission with a TCI state different from that of the target reference signal; wherein
the target symbol is a beam switching symbol of the target reference signal;
wherein the target reference signal is a configured first reference signal and/or a second reference signal configured for performing first measurement, and the beam switching symbol of the target reference signal comprises at least one of the following symbols:
N symbols before or after the target reference signal symbol, wherein N is an integer, and N>1;
N symbols before or after consecutive target reference signal symbols, wherein N is an integer, and N>0; or
a predetermined symbol in a target spacing symbol, wherein the target spacing symbol is at least one of the following spacing symbols:
a spacing symbol between consecutive target reference signals;
a spacing symbol between consecutive target reference signals with different quasi-co-location assumptions; or
a spacing symbol between repeated target reference signals with a quasi-co-location assumption.

11. The communications device according to claim 10, wherein the first measurement comprises at least one of the following:
   intra-frequency measurement of SS-RSRP;
   intra-frequency measurement of SS-SINR;
   intra-frequency measurement of RSRQ;
   L1-RSRP measurement;
   radio link monitoring;
   beam failure detection; or
   candidate beam detection.

12. The communications device according to claim 10, wherein different first measurements correspond to different second reference signals.

13. The communications device according to claim 10, wherein before the performing signal transmission at a position of a target symbol, when the program or instructions are executed by the processor, the following steps are further implemented:
   reporting a beam switching capability, wherein the beam switching capability is used to indicate whether to reserve a symbol for beam switching.

14. The communications device according to claim 13, wherein the reporting a beam switching capability comprises at least one of the following:
   reporting a value of N, wherein the value of N is used to indicate reserving a symbol for beam switching and a length of the reserved symbol; or
   reporting whether multi-panel is supported, wherein whether multi-panel is supported is used to indicate whether to reserve a symbol for beam switching.

15. The communications device according to claim 10, wherein before the performing signal transmission at a position of a target symbol, when the program or instructions are executed by the processor, the following steps are further implemented:
   receiving a target transmission behavior indication sent by a network device, wherein the target transmission behavior indication is used to indicate whether to perform, by using the target transmission mode, signal transmission at a target symbol position related to the target reference signal.

16. The communications device according to claim 10, wherein the target uplink transmission comprises one or more of the following transmissions:
   PUSCH, PUCCH, SRS, and PRACH; and/or
   the target downlink transmission comprises one or more of the following transmissions: PDCCH, PDSCH, PTRS, and CSI-RS.

17. The communications device according to claim 16, wherein the CSI-RS comprises at least one of the following types:
   TRS, CSI, or tracking CSI.

18. The communications device according to claim 10, before the performing signal transmission at a position of a target symbol by using a target transmission mode, when the program or instructions are executed by the processor, the following steps are further implemented:
   in a case that a serving cell of a terminal device satisfies a predetermined condition, performing signal transmission at the position of the target symbol by using the target transmission mode; wherein
   the predetermined condition comprises at least one of the following conditions:
   the serving cell is located within a predetermined frequency range; or
   an SCS of the serving cell or its active BWP is a predetermined SCS.

* * * * *